United States Patent [19]

Ledermann

[11] 3,959,986

[45] June 1, 1976

[54] HEAT-PUMP SYSTEM FOR HOT-WATER ROOM-HEATING

[76] Inventor: Hugo Ledermann, Glarnischstrasse 30, Stafa, Switzerland

[22] Filed: Oct. 15, 1974

[21] Appl. No.: 515,077

[30] Foreign Application Priority Data

Oct. 16, 1973 Switzerland.................... 14653/73

[52] U.S. Cl.................................. 62/324; 62/160
[51] Int. Cl.² ........................................ F25B 13/00
[58] Field of Search ............... 62/324, 238, 79, 160

[56] References Cited
UNITED STATES PATENTS

| | | | |
|---|---|---|---|
| 2,619,326 | 11/1952 | McLenegen | 62/238 |
| 2,713,252 | 7/1955 | Jackson | 62/324 |
| 2,720,083 | 10/1955 | Garland | 62/279 |
| 2,751,761 | 6/1956 | Borgerd | 62/324 |
| 3,240,028 | 3/1966 | Redfern | 62/324 |

*Primary Examiner*—Lloyd L. King
*Attorney, Agent, or Firm*—Karl W. Flocks

[57] ABSTRACT

A heat pump system for space heating by hot water using external air as a source of heat with an air cooler acting as evaporator, a compressor and a condenser for heating the water, with the heat pump capable of operating in two temperature ranges if the external temperatures are low. The system also includes a hot-water storage vessel and water cooler and a defrosting regulator to defrost by hot compressed, evaporated cooling agent.

8 Claims, 1 Drawing Figure

U.S. Patent June 1, 1976 3,959,986
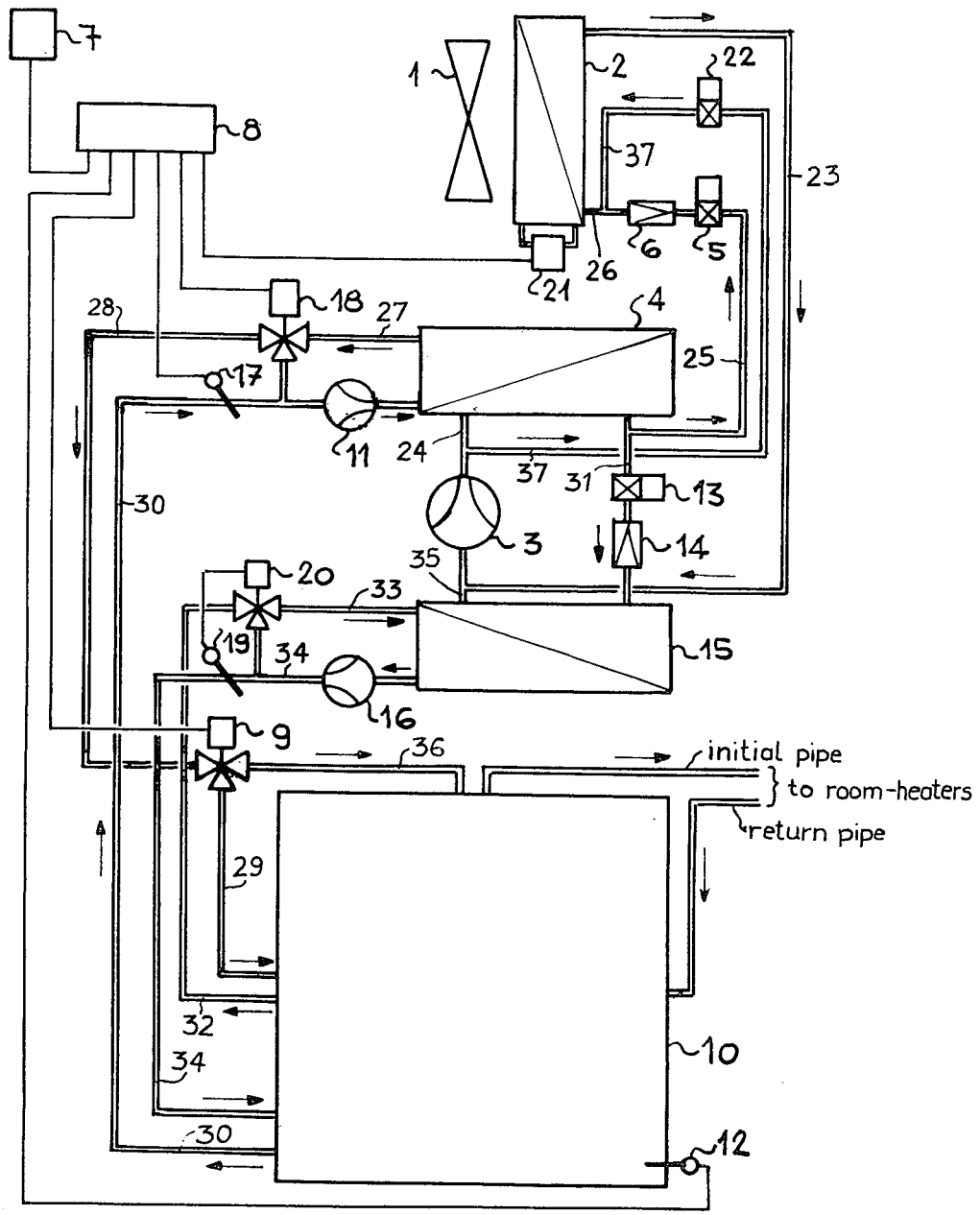

HEAT-PUMP SYSTEM FOR HOT-WATER ROOM-HEATING

Room-heating systems using hot water heated by heat pumps make use of the heat from spring, river or sea water or from the earth or air. Atmospheric air is the only one of these heat sources which is available in unlimited quantity everywhere. Its temperature is very variable and decreases greatly in winter, at the same time as the room-heating requirement increases. The hot-water temperature has to be correspondingly increased as a result.

If the atmospheric air temperature is low, the cooling agent has to evaporate at an even lower temperature in the heat-pump evaporator. If the hot-water temperature is high, the condensation temperature in the condenser has to be still higher. Consequently, the temperature range which has to be performed by the heat pump decreases greatly when the external temperature falls. There is an increase in the compression ratio resulting from the cooling-agent vapour pressures corresponding to the evaporation and condensation temperature. The compression ratio may reach values which cannot be performed by commercial single-stage compressors unless their output is greatly reduced.

An object of the invention is to lessen the reduction in output and facilitate the use of commercial single-stage compressors. The invention relates to a heat-pump installation for room heating by hot water, using the external air as a source of heat, comprising an air cooler operating as an evaporator, a compressor, a condenser, a hot water storage vessel and room-heaters supplied thereby, and an evaporator operating as a water cooler for cooling water from the storage vessel. The installation according to the invention is characterized in that the water in the storage vessel is heated, and that with heat, which is withdrawn from the external air by the air cooler, is supplied by the compressor and condenser to the water, circulating through the storage vessel. Accordingly, the heat pump can be operated in two temperature ranges if the external temperatures are low. Since the resulting large temperature range is divided into two smaller or partial ranges, the compression ratio for the two partial ranges can be reduced so that, when the external temperatures are low, the compression ratio can be several times as great as that obtained by single-stage operation. In addition, the compression ratios for both partial ranges are within the normal capacity of commercial single-stage compressors.

The invention will now be described with reference to an embodiment shown diagrammatically in the drawings.

A fan 1 conveys atmospheric air through an evaporator 2 having finned tubes in which a cooling agent evaporates and absorbs heat from the air. The evaporated cooling agent is sucked in through pipe 23 by a compressor 3 and conveyed at an elevated pressure through pipe 24 into a condenser 4 where it gives up heat to the water flowing therethrough heating agent flows back to evaporator 2 through pipes 25 and 26 via a solenoid valve 5 and a throttle means 6.

At relatively low external temperatures, the water heated in condenser 4 is supplied approximately half-way up to a hot-water storage vessel 10 through pipes 27, 28, 29 and via a three-way valve 9 controlled by an external temperature probe 7 and a control device 8 in the deflection position, whereas the water flowing to condenser 4 is withdrawn from the lower zone of storage vessel 10 through pipe 30 by a pump 11. As long as hot water at a relatively low temperature is available at the lower zone of vessel 10, the temperature of the hot water leaving condenser 4 is also low and also corresponds to the temperature at which the cooling agent condenses and to the compression ratio, in spite of the low external air temperature and the low evaporation temperature. The reduction in the compressor output caused by the low evaporation temperature is partially compensated by the reduction in the compression ratio.

If the contents of the lower zone of vessel 10 is heated to the temperature of the hot water flowing through pipe 29 from condenser 4, fan 1 is switched off by a thermometer probe 12 and control device 8, and solenoid valve 5 is closed so that evaporator 2 becomes inoperative. Simultaneously, solenoid valve 13 is opened and supplies cooling agent through pipe 31 via a throttle means 14 into an additional evaporator 15 acting as a water-cooler. Evaporator 15 is supplied through pipes 32, 33 with slightly heated water from approximately half-way up vessel 10, which flows down and back into the lower zone of vessel 10 through a pipe 34 via a pump 16 which is likewise operated by control device 8. The hot water gives up its heat and the cooling agent evaporates in evaporator 15 and the resulting vapour is sucked in through a pipe 35 by compressor 3 and supplied through the pipe 24 at elevated pressure to condenser 4, where it liquefies after giving up its heat to the water flowing through condenser 4. The three-way valve 9 is now opened by sensor 12 and control device 8 for a straight passage, and the hot water flows from condenser 4 through pipes 27, 28 and 36 to the upper zone of vessel 10. The hot-water temperature is registered by the thermometer probe 17 which, acting via control device 8, adjusts the mixing valve 18 so that the hot water temperature corresponds to the initial room-heating temperature set by the external thermometer probe 7.

If the heat required by the room-heating system is less than the heat produced by the heat pump, the excess is stored in vessel 10. If the hot water stored at the initial temperature extends into the low storage zone, the thermometer probe 19 adjusts the mixing valve 20 so that only water at the minimum temperature flows from evaporator 15. Consequently, the entire contents of vessel 10 can be brought to the hot-water temperature set by the external thermometer probe 7.

If the external temperature is higher, so that compressor 3 can, without a disadvantageous reduction in output, perform the compression corresponding to the temperature range between the evaporation and the condensation temperature, the external thermometer probe 7 opens the three-way valve 9 via the control device 8 for a straight passage and with the thermometer probe 17 the mixing valve 18 is simultaneously brought into operation, so that the hot water leaving condenser 4 through pipe 27 directly reaches the initial temperature set by the external thermometer probe 7 and flows through pipes 27, 28, and 36 into the vessel 10.

The transition from evaporator 2 to evaporator 15 can also be triggered by frost formed on evaporator 2 from moisture precipitated from the external air. Triggering is brought about by a defrosting regulator 21 and adjusts the operation of the heat pump in the same manner as the thermometer probe 12, and also opens solenoid valve 22 so that evaporator 2 is defrosted by hot compressed, evaporated cooling-agent through the pipes 24, 37, and 26.

If the external temperature approaches the heating limit, the heat required by the space-heating system falls to its minimum value and the heating pump simultaneously reaches its maximum output and operates discontinuously. In order to avoid switching at a rate which may damage the compressor motor, the hot-water storage vessel 10 is advantageously dimensioned so that it can store the excess hot water produced without exceeding the permissible switching rate.

Frequently, for several hours during the day, the power station cuts off the supply of electric power for heating purposes, i.e. for a heat-pump motor. Accordingly, the capacity of vessel 10 is made sufficient to provide heat during the shut-off periods.

If power can be supplied throughout the day but at a higher rate, the storage vessel 10 may advantageously be dimensioned so that it can cover the daily heating requirements by heating during the low-rate periods when the external temperature is above 0° Celsius, whereas when the external temperature is lower, it supplies the increased heat required for room-heating by being completely discharged via the evaporator 15 and by using power at the higher rate. It has been found by experience that there are only a few days when the external temperature is low and more expensive power has to be used for heating.

I claim:

1. A heat-pump system for room heating by hot water, using the external atmospheric air as a source of heat, comprising an air cooler operating as an evaporator, a compressor connected to said air cooler, a condenser connected to said compressor, a hot-water storage vessel and room-heaters supplied thereby, and an evaporator operating as a water cooler for cooling water from said storage vessel, characterized in that the water in said storage vessel is heated, and that with heat, which is withdrawn from the external air by said air cooler, is supplied by said compressor and said condenser to the water, circulating through said storage vessel.

2. A heat-pump system according to claim 1, further characterized in that the hot-water storage vessel has a lower and an upper zone.

3. A heat-pump system according to claim 2, further characterized in that when the external temperature is low, especially below 0°C. (32°F.), the heat withdrawn from the external air by said air cooler, including the heat equivalent of the compression work, is supplied by said condenser to said lower zone of said hot-water storage vessel and thereby this lower zone is heated to the temperature of the supplied water.

4. A heat-pump system according to claim 1, characterized in that said compressor is of single-stage construction.

5. A heat-pump system according to claim 1, characterized in that said air cooler is intermittently switched off and, during the switched-off periods, said evaporator for cooling water from said storage vessel works together with said compressor and said condenser, water being supplied to said evaporator from said storage vessel, whereby the heat withdrawn from the water, including the heat equivalent of the compression work, being supplied to the water in the upper zone of said hot-water storage vessel via said compressor and said condenser to increase the water temperature in the upper zone of the storage vessel to a value which is at least equal to the initial temperature required by the room-heaters.

6. A heat-pump system according to claim 1, characterized in that when frost forms on said air cooler it is put out of operation and said water cooler is put into operation for defrosting said air cooler with at least partly using hot gas.

7. A heat-pump system according to claim 1, characterized in that the excess of heat, which is withdrawn from the external air by said air cooler can be stored in said storage vessel in a suitable quantity.

8. A heat-pump system according to claim 1, characterized in that the capacity of said storage vessel is made sufficient to supply the heat required for room-heating during the time when the electric power supply for operating the heat-pump system is cut off.

* * * * *